United States Patent [19]

Spriester et al.

[11] Patent Number: 5,581,801
[45] Date of Patent: Dec. 3, 1996

[54] APPARATUS FOR DISTRIBUTING RF SIGNALS AND AC POWER TO TAPS

[75] Inventors: Bart Spriester, Duluth; Gregory L. Herrmann, Decatur; Robert S. Collmus, Alpharetta; James L. Dale, Lawrenceville, all of Ga.

[73] Assignee: Scientific-Atlanta, Inc., Norcross, Ga.

[21] Appl. No.: 408,529

[22] Filed: Mar. 22, 1995

[51] Int. Cl.⁶ .................................................. H04N 7/16
[52] U.S. Cl. .................................. 455/3.3; 455/3.1; 348/6
[58] Field of Search ............................. 348/6, 8, 10, 11, 348/12, 13; 455/3.2, 3.1, 4.1, 4.2, 5.1, 6.1, 6.2, 3.3; 340/310.01, 310.02, 310.03, 310.04, 310.05, 310.06, 310.07, 310.08, 538; H04N 7/16, 7/10

[56] References Cited

U.S. PATENT DOCUMENTS

| | | | |
|---|---|---|---|
| 4,367,557 | 1/1983 | Stern et al. | 455/4 |
| 4,963,966 | 10/1990 | Harney et al. | 358/349 |
| 5,058,198 | 10/1991 | Rocci et al. | 455/3 |
| 5,216,569 | 6/1993 | Brookhiser | 361/107 |
| 5,331,412 | 7/1994 | Farmer et al. | 348/5.5 |
| 5,410,720 | 4/1995 | Osterman | 455/3.3 |
| 5,483,208 | 1/1996 | Spriester | 333/131 |

Primary Examiner—John K. Peng
Assistant Examiner—Chris Grant
Attorney, Agent, or Firm—Steven C. Stewart

[57] ABSTRACT

A method and system for distributing multimedia signals to a subscriber from a headend unit. The multimedia signals are transmitted on a network media as a composite RF and AC signal. A passive unit is upgraded by with a circuit having connectors that separates the AC from the RF signal. The signals are split in the upgraded passive unit. The AC signal is fed to a power distribution unit which generates an AC output signal that is surge protected, RF filtered and current limited. The RF signal and AC output signal are separately fed to a customer interface unit where the RF signal is decoded and transmitted to a subscriber. By providing a passive unit where the AC and RF signal are separated in the same unit, the system can be upgraded with a power distribution unit when AC signals are required to supply power to subscriber equipment.

12 Claims, 8 Drawing Sheets

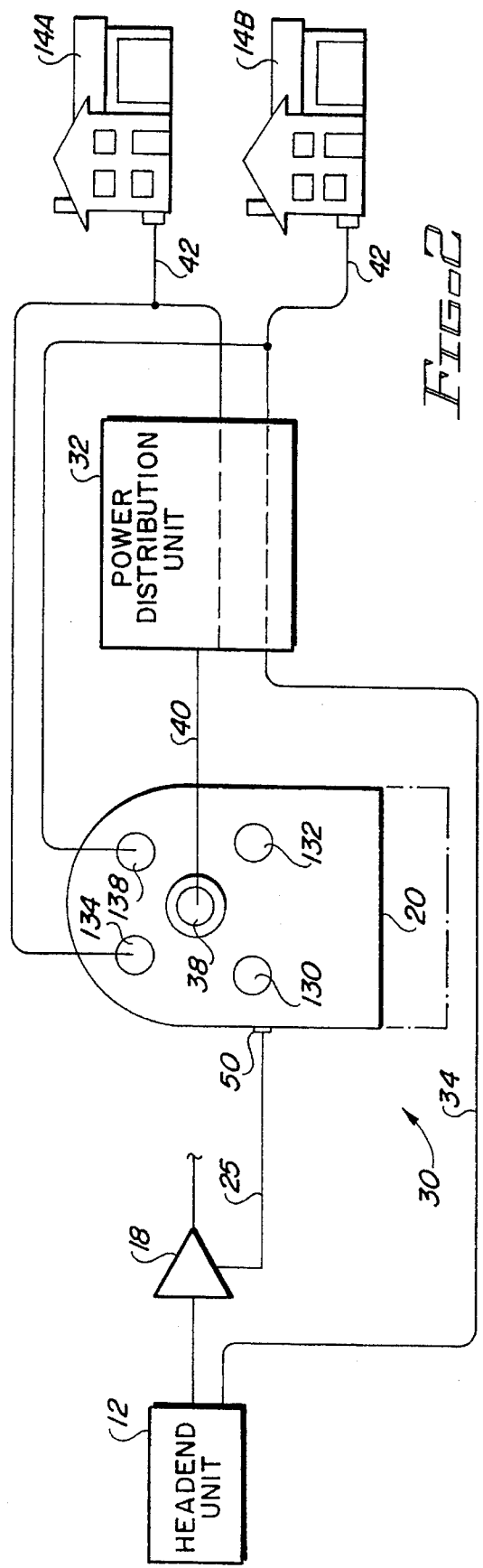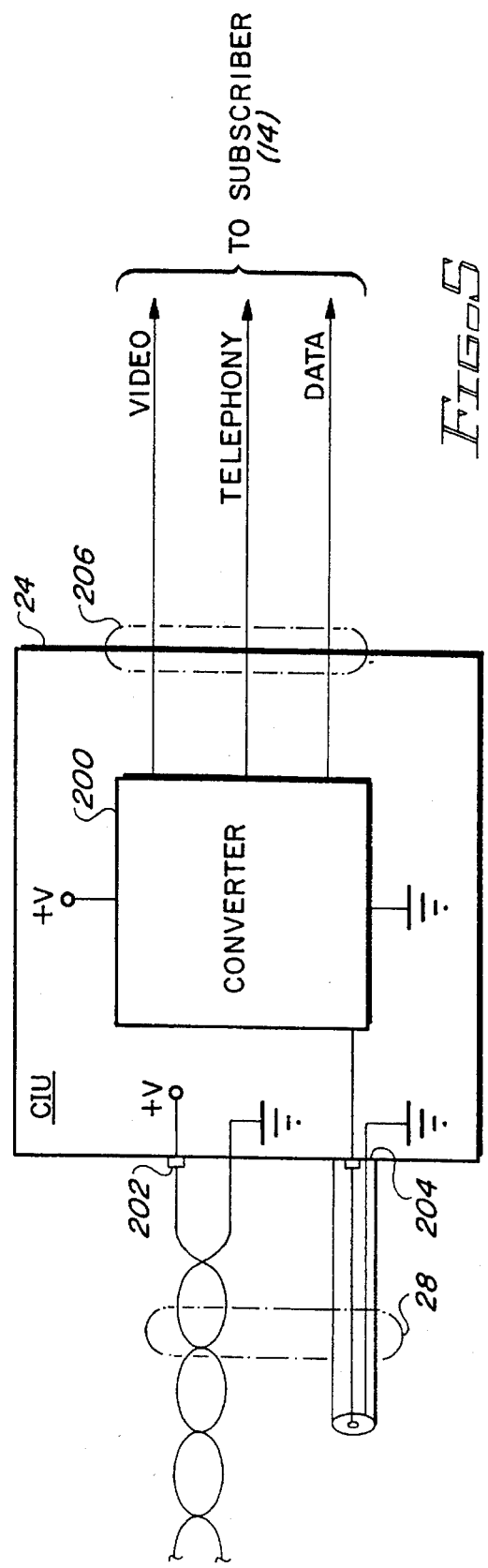

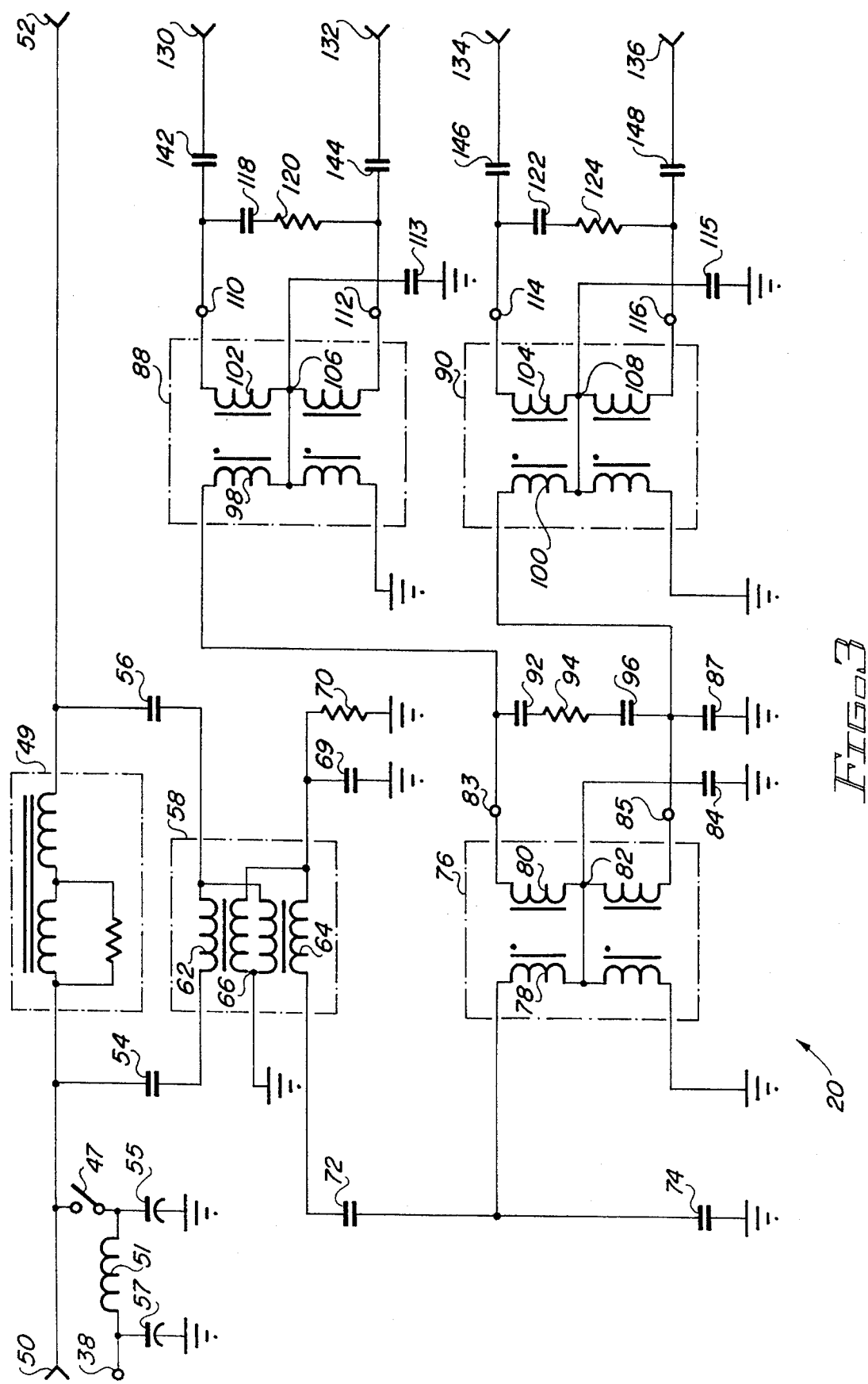

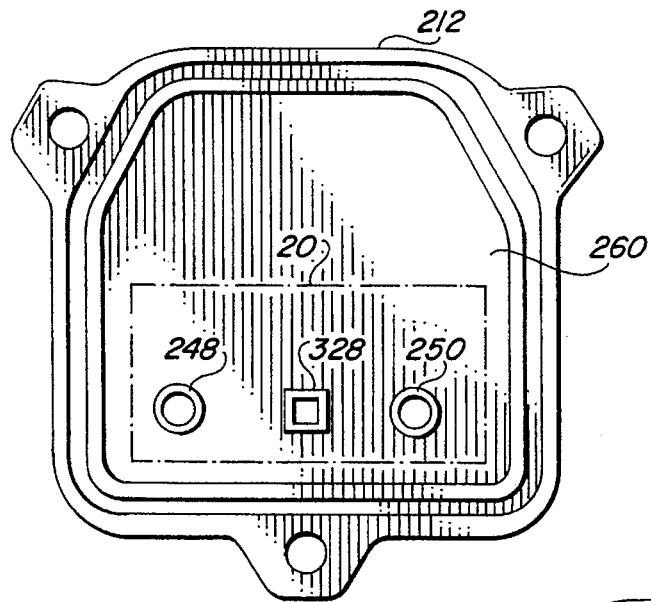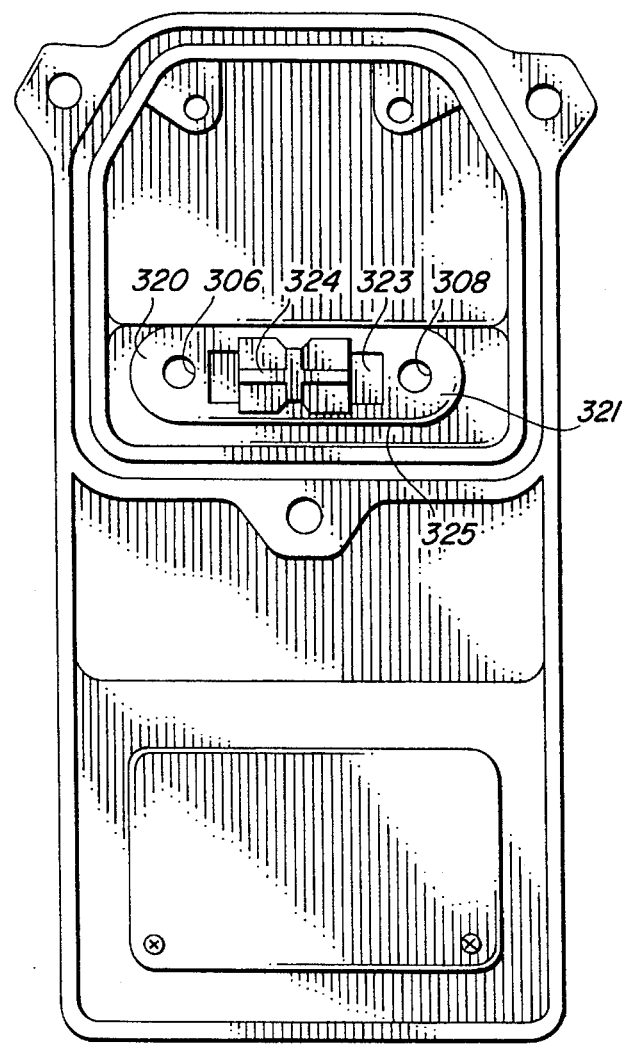

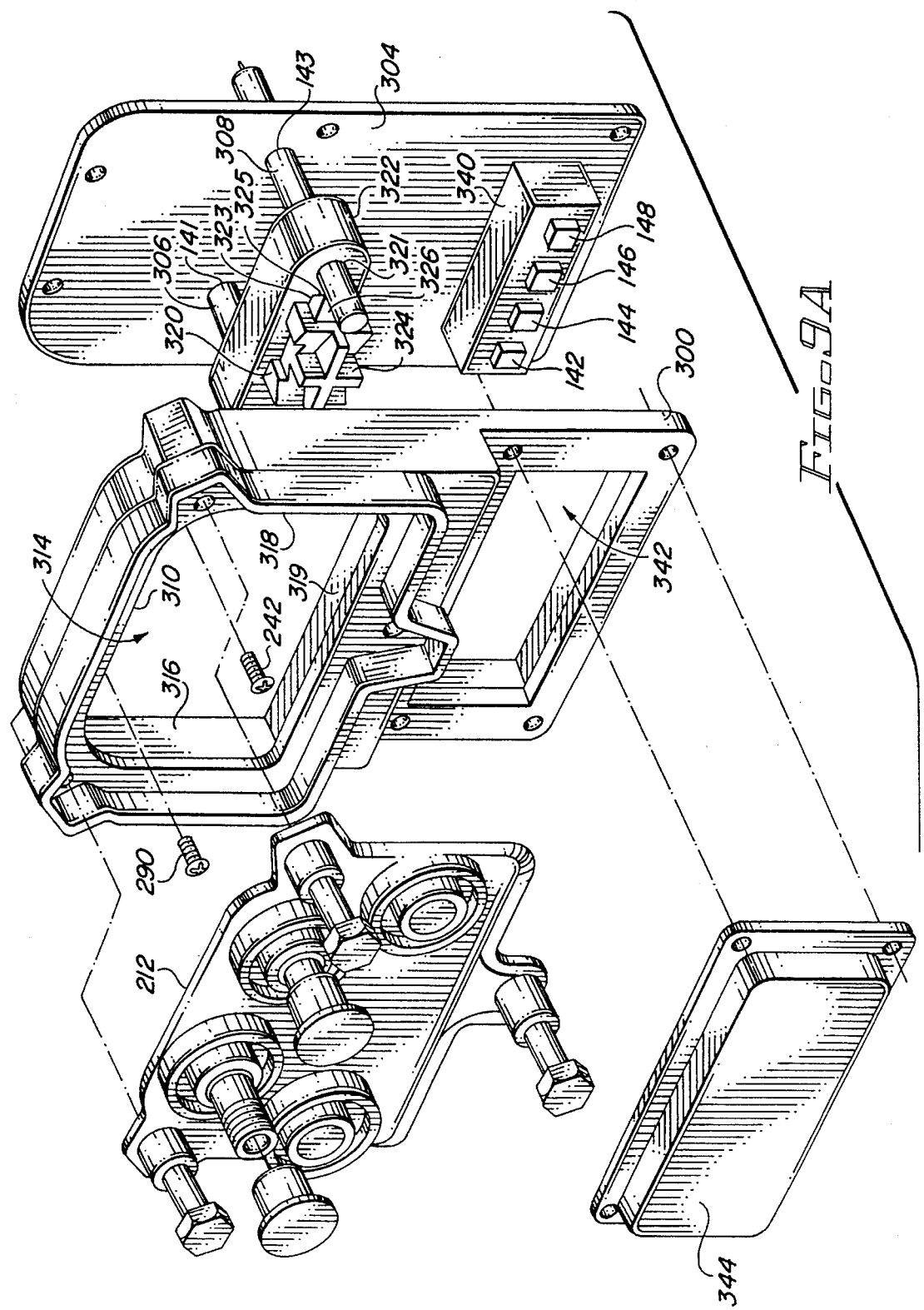

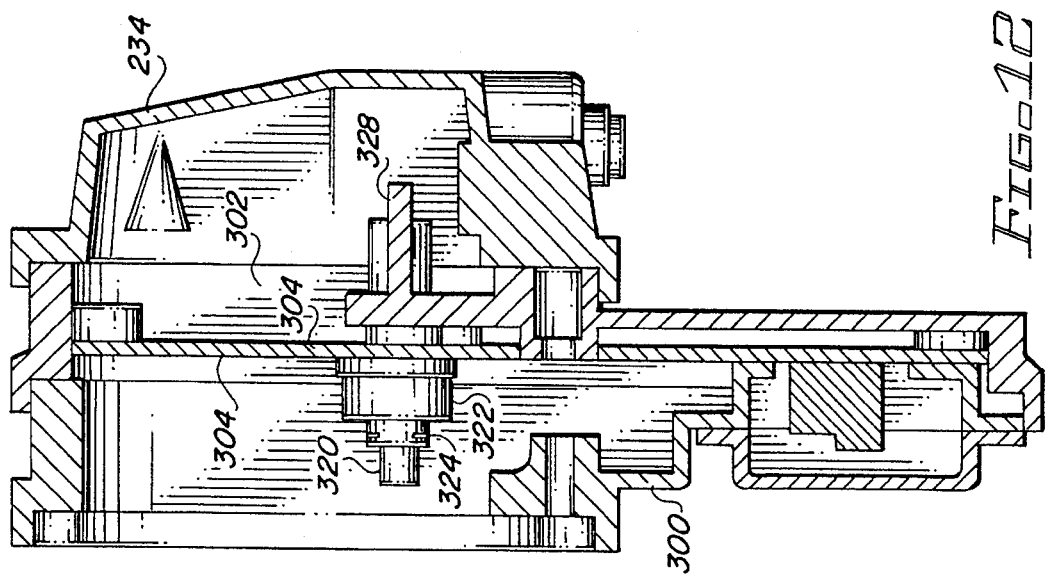
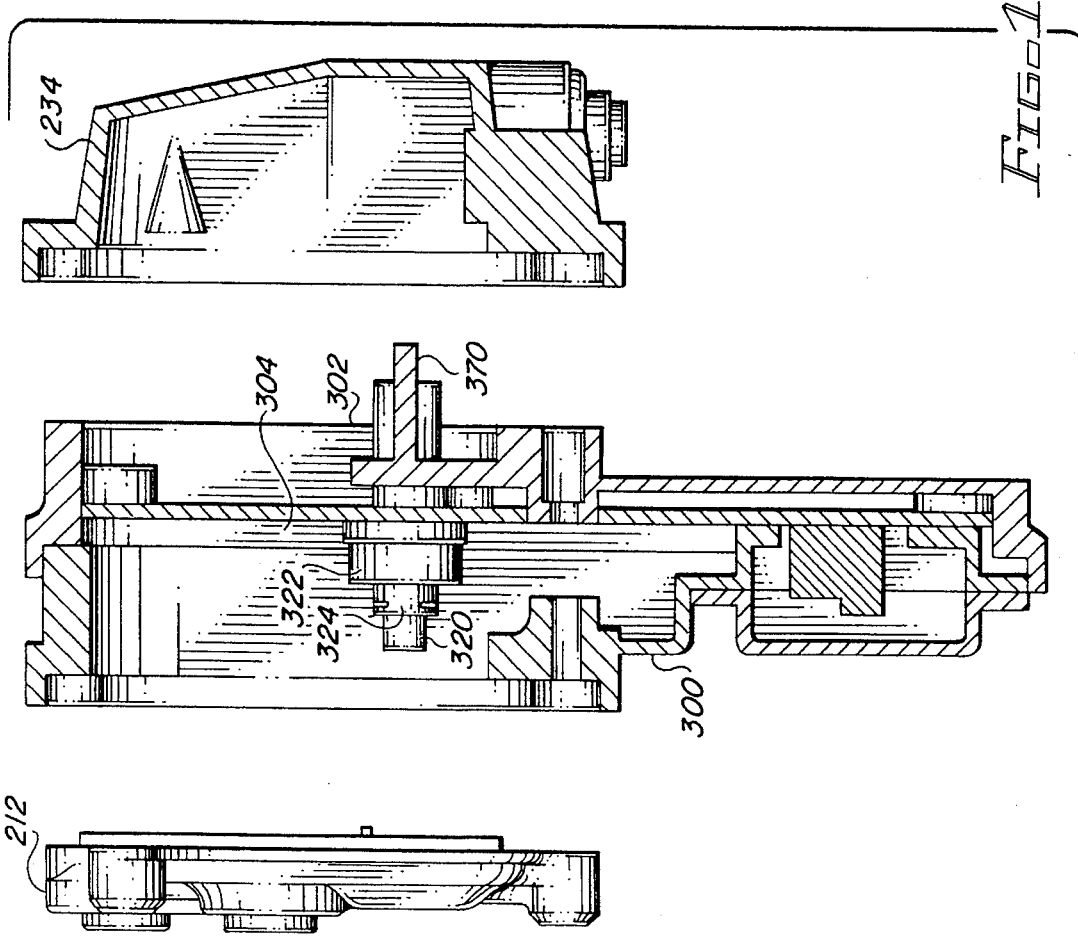
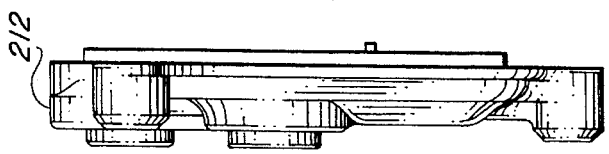

APPARATUS FOR DISTRIBUTING RF SIGNALS AND AC POWER TO TAPS

BACKGROUND OF THE INVENTION

This invention relates to a method and apparatus for distributing broadband signals to a subscriber, and more particularly to a system for splitting RF signals and AC power signals originating on the same media, and then distributing these split signals to the home.

When distributing radio frequency (RF) signals, such as video signals, over cable, it is common practice to transmit RF signals and single phase AC power signals over the same coaxial cable simultaneously.

These RF signals originate from a central location commonly referred to as the "headend". The media used to carry the RF signals, typically a coaxial cable, inherently has loss characteristics. Thus an amplifier station must be installed at appropriate locations along the cable to compensate for the losses and deliver the RF signal levels as closely as possible to what they were at the headend. The single phase AC power signal, which in the United States is conventionally 60 Hz, is needed to operate the amplifier stations.

The peak power signals are passed along the cable concurrently with the RF signals. The power level of the AC signal is typically 50,000 times greater than that of the RF signal, and uses different and separate circuitry to operate the amplifier station. Therefore, the AC power signal must be separated from the RF signal at each of the amplifier stations.

Other equipment, in addition to the aforementioned stations, is used in cable distribution for separately distributing RF signals to the home according to subscriber requirements. Certain other equipment such as passives (also referred to as a tap) does not need the single AC power signals for its operation. Passives tap off the RF signal from the cable distribution system and feed the tapped off RF signal to various subscriber equipment. With the advent of interactive television, these passives must also pass RF signals from the home to the headend (upstream) without interfering with AC and RF signals sent to other passives and amplifiers (downstream). The passive equipment, however, must also pass and distribute the AC power signal downstream without interfering with the various operations that relate to the RF signals.

In today's distribution network, certain other equipment such at network interface units (NIU's) and customer interface units (CIU's) are coupled to the home to provide subscriber services to the subscriber such as voice (i.e. telephony), video, data (i.e. modem and facsimile transmissions). The NIU and CIU do need the single AC power signal and a separate RF signals from the passives for its operation. The NIU and CIU because they supply telephony, must supply signals to the home in the event of a power failure. Therefore the NIU and CIU must receive uninteruptable power.

Unfortunately when the prior systems were originally installed there was no provision for providing separate AC power signals from existing passives to the NIU's and CIU's. Thus to upgrade the distribution network to provide this feature the entire passive must be replaced with a new passive that supplies a separate AC power signal to the NIU or CIU. Also when supplying a separate AC power signal to NIU's and CIU's, the current must be limited in the new passive to prevent network failure in the event of a NIU or CIU short circuit. This replacing the passive with one that supplies AC power and adding a current limiting feature increases the cost of upgrading the network.

Subscribers may not need NIU's or CIU's to supply their present demands. Thus it may not be necessary to add current limiting features until the later when the revenues are generated from added services provided by the NIU or CIU. As a result of these market requirements, network operators may want the capability for upgrading their systems but do not want to immediately incur the upgrade cost.

Prior taps distribute RF signals typically carrying video and voice data from a central location, referred to as a headend to a plurality of subscribers. Typically these taps have frequency ranges of zero to 550 MHz. These taps have an input terminal that receives signals from the headend, and an output terminal where these signals received are distributed downstream to other taps. When these taps are upgraded to support higher frequencies, the circuit inside the tap must be removed. Upon removing the tap, service downstream is temporarily disconnected. When supplying video, a short temporary disconnect of service was tolerated by the subscribers. However, taps are now being used to send and receive telephony signals. Thus a temporary disconnection in service is unacceptable.

SUMMARY OF THE INVENTION

In accordance with the present invention an improved system is disclosed for use in cable and telephony systems over which RF signals and AC signals are transmitted and distributed. An existing passive cover plate which separates RF signals from a composite RF/AC signal is replaced with a cover plate that contains circuits which separates the AC signals from the RF signals. The AC and RF signals are separately supplied to connectors on the new cover plate. The RF signals are then feed either to the subscriber or to an interface unit. The separated AC signals are fed to a power distribution unit when the system is upgraded. The power distribution unit limits the current of the AC signal, and feeds this limited current to power the interface unit.

An object of this invention is to provide an improved method and apparatus for distributing RF and AC signals carrying voice, data or video information to a subscriber.

Another object of this invention is to upgrade existing passives with a circuit which separate RF signals from AC signals and supplies these separated signals to connectors on a face plate for distribution to a subscriber on demand.

An additional object of this invention is to supply RF signals to a subscriber using a passive that can be combined with a distribution unit at a later time that will supply current limited AC power to the subscriber.

It is also an object of this invention to supply a method of upgrading an existing passive system with a system that can supply RF signals and AC signals that can be current limited when needed.

Another object of this invention is to connect a power distribution unit to an existing tap such that he tap can be upgraded without interrupting service downstream.

It is an additional object of this invention to supply a unit that distributes power originating from a RF line to subscribers from a self contained power/RF distribution unit.

A further object of this invention is to supply power to a network interface unit from a passive that can also be used to supply power to a power distribution unit.

These and other objects of the invention are provided with a system for distributing multimedia information from a headend unit to a subscriber. The system includes a network media operative to distribute a composite AC power signal and RF signal, wherein the RF signal contains multimedia information originating from the headend. The system also has a tap that includes a composite input terminal coupled to the network media for receiving the composite signal. The tap has a plurality of RF output terminals to which the RF signal received by the composite input terminal is fed, and an AC output terminal to which the AC signal received by the composite input terminal is distributed.

Connected to the tap is a power distribution unit including an input terminal connected to the AC output terminal via a power line and receiving the AC power signal on the power line. The tap has a plurality of AC output terminals to which the received AC power signal is fed; and a limiter disposed within the power distribution unit which limits a maximum output current of the AC power signal fed to the AC output terminals.

In a preferred embodiment of the invention an apparatus for distributing composite AC and RF signals transmitted over a network media is provided. The apparatus includes a tap with a rear plate having a composite input terminal coupled to said network media through which the composite signal is received. The tap has a composite output terminal through which said composite signal is distributed to said network media. An RF circuit is electrically coupled to the composite input terminal and is operative to split the RF signal from the composite signal. The tap has a face plate operative to engage with the rear plate with an RF output terminal connected thereto to which the split RF signal is fed. A power distribution unit (PDU) disposed between said rear plate and said face plate. The PDU has a power distribution circuit coupled to said input terminal and splitting the AC power signal from the composite signal. The PDU also has a plurality of AC output terminals to which the AC power signal is fed and a limiter disposed within said power distribution unit and operative to limit a maximum output current of the AC power signal fed to the AC output terminals.

The foregoing and other objects of the present invention a well as the invention itself, may be more fully understood from the following description when read in conjunction with the accompanying drawings.

BRIEF DESCRIPTION OF THE DRAWINGS

FIG. 2 is a block diagram of a system for distributing video and fiber to the curb telephony signals from a headend unit to a subscriber home in accordance with the invention;

FIG. 3 is a schematic diagram of the passive unit shown in FIGS. 1 and 2;

FIG. 5 is a block diagram of a customer interface units shown in FIG. 1;

FIG. 8 is a rear view of a face plate for passive unit shown in FIGS. 1, 2, 7a and 7b.

FIG. 9A and 9B are exploded views of a preferred embodiment of a power distribution unit connected to a tap;

FIG. 10 is a side section view of the power distribution unit shown in FIG. 9;

FIG. 11 is a front view of the power distribution unit shown in FIG. 10;

FIG. 12 is a side sectional view of the power distribution unit shown in FIG. 11.

DETAILED DESCRIPTION OF THE PREFERRED EMBODIMENT

Figure 1:
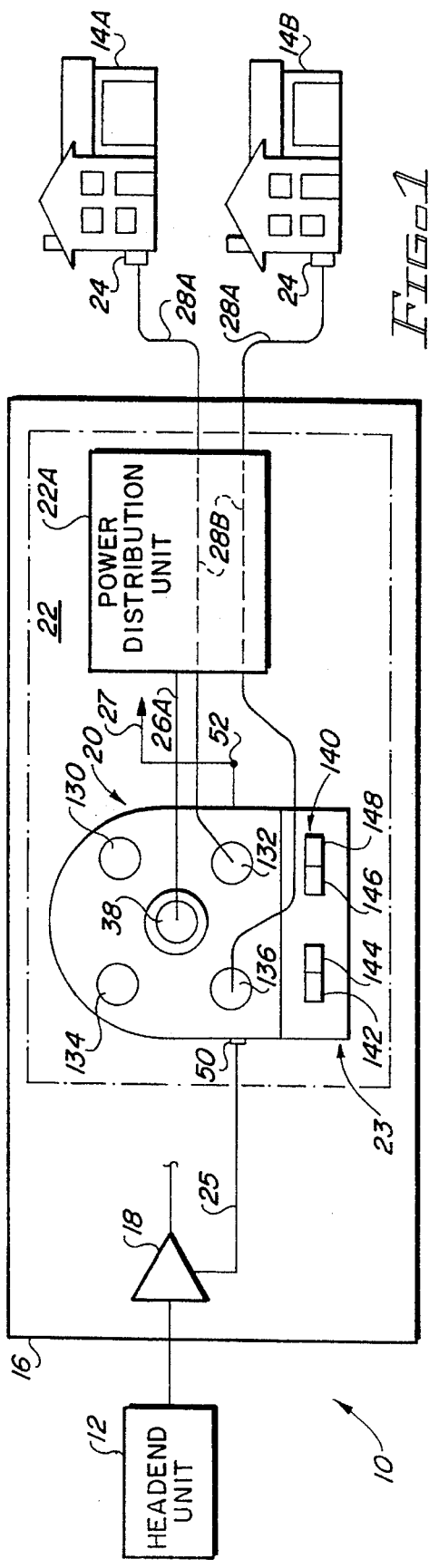
FIG. 1 is block diagram of a system for distributing video and telephony signals from a headend unit to a subscriber home in accordance with the invention.

Referring to FIG. 1, there is shown a system 10 for distributing data, sound, and video, generally referred to as multimedia information, from a headend unit 12 to the homes 14a and 14b of a subscriber. The headend 12 typically receives RF signals carrying the multimedia information from a satellite, cable, fiber optic network, microwave, VHF, UHF, or other sources and transmits these signals a subscriber home 14 via distribution network 16. Distribution network 16 includes a Hybrid Fiber or Coax network 18 which connects headend unit 12 with a passive, hereafter referred to as tap 20.

Tap 20, shown in more detail in FIG. 3, receives a combined signal having an RF signal component and an AC signal component, herein referred to as a composite signal, from network 18. The composite signal is received on input port or terminal 50. The composite signal exits tap 20 at output terminal 52 where it is fed onto cable 27 to other devices downstream on the network 18. Tap 20 splits the composite signal into a plurality of RF signals and an AC signal. Tap 20 feeds the AC signal to power distribution unit (PDU) 22, details of which are explained later in FIG. 4. The PDU 22 is shown separated from tap 20, however, PDU 22 is preferably incorporated into tap 20 to form a unitary multimedia tap 23 as shown in FIGS. 9–12.

The split RF signals exits terminals 130–136 of tap 20 and are respectively fed to a customer interface unit (CIU) 24 that is typically located on the side of home 14. The composite signal is fed to tap 20 over a network coaxial cable 25 and upon exiting tap 20 is fed to network coaxial cable 27. Tap 20 optionally contains a power terminal 38 from which the AC signal may be fed to PDU 22A terminal 140 using a coaxial cable 26A. In this embodiment, the AC signal exits terminals (not shown) within PDU 22A and distributed to CIU 24 on a twisted pair portion of a composite coax/twisted pair drop cable 28A. The RF signal, carrying video, data and telephony, is fed from terminals 132 and 136 of tap 20 to the CIU 24 on coax cable 28A.

In the preferred embodiment of the invention the AC signal is fed to a circuit board 23 on PDU 22. Circuit board 23 contains connector terminals 140 that engage with tap 20 (See FIGS. 9–12). The AC signal, carrying AC power, exits terminals 142–148 of PDU 22B and is fed to CIU 24 on a twisted pair portion of a composite coax/twisted pair drop cable 28B. The RF signal, carrying video, data and telephony, is fed from terminals 132 and 136 of tap 20 to the CIU 24 on coax cable 28B directly to the CIU's 24.

Although tap 20 is shown directly providing the AC signal via PDU 22 to CIU 24, tap 20 can supply power directly to CIU 24, or only supply RF signals to CIU 24. CIU 24 contains circuitry shown in FIG. 5, to convert composite RF signals into signals which can be used by the subscriber's various multimedia equipment.

Referring to FIG. 2, there is shown an another system 30 for delivery of multimedia information from a headend unit 12 to the homes 14a and 14b of a subscriber. In system 30, telephony multimedia information is delivered from headend 12 to a curbside network interface unit (NIU) 32 via a fiber loop 34. A composite signal containing other multimedia information is delivered to tap 20 via a hybrid fiber/coax network 18 over network cable 25. An AC signal is supplied to the NIU 32 via a power terminal 38 on tap 20. A composite twisted pair and coax drop cable connects the NIU and tap 20 to the subscriber homes 14a and 14b. The AC signal is fed through cable 40 to power NIU 32. The RF signal exists RF terminals 130–136 on tap 20, and is supplied to the subscriber homes 14a and 14b using a coaxial cable portion of composite cable. The NIU 32 supplies the telephony information to the home through a twisted pair cable portion of the composite drop cable 42.

NIU 32 type devices are well known in the industry for supplying telephony signals to homes. They typically include circuitry that converts addressable telephony information from a optical signal, to an analog voice signal and then routes the analog signal to the addressed subscriber. NIU 32 also contains circuitry that converts telephony signals from subscribers homes, for transmission on the fiber loop to the headend 12.

Referring to FIG. 3, there is shown an example tap 20 having a coupler 58 coupled in parallel with choke 49. Choke 49 passes AC power signals from input terminal 50 to output terminal 52. Choke 49 filters RF signals that within composite signal on input terminal 50. A preferred tap is disclosed in pending U.S. patent application Ser. No. 08/297,724 filed Aug. 26, 1994, which is hereby incorporated by reference. Also connected to input terminal is jumper 47. Inductor 51 connects through jumper 47 to input terminal to pass AC signals to AC power terminal 38. Jumper 47 functions as a switch to remove and connect power terminal 38 from circuit 20. Connected between the junction of inductor 51 and ground is shunt capacitor 55. Connected between power terminal 38 and ground is shunt capacitor 57.

Coupler 64 is coupled to input terminal 50 and output terminal 52 through capacitor 54 and capacitor 56 respectively. Capacitors 54 and 56 block the AC signal on input terminal 50 and output terminal 52. Coupler 58 includes primary winding 62 and secondary winding 64, each having a predetermined number of windings.

Coupler 58 has a grounded center tap 66. Primary winding 62 is operative to pass the RF signals on input terminal 50 to output terminal 52, and also couples the RF signals to secondary winding 64. One end of secondary winding 64 is connected in parallel through capacitor 68 and resistor 70 to ground. The other end of secondary winding 64 is grounded through capacitor 72 and capacitor 74. The junction of capacitors 72 and 74 is connected to splitter 76.

Splitter 76 includes a primary winding 78 and secondary winding 80, each having a center tap 82 grounded through capacitor 84. One end of primary winding 78 is connected to capacitors 72 and 74 junction, and the other end is grounded. The secondary winding 80 of splitter 76 has a first terminal 83 connected to splitter 88, and a second terminal 85 connected to splitter 90. Connected in series between terminals 83 and 85 are capacitor 92, resistor 94 and capacitor 96.

Splitters 88 and 90 have primary terminals 98 and 100, secondary terminals 102 and 104, and center taps 106 and 108, which are respectively coupled through capacitors 110 and 112 to ground. Splitters 88 and 90 couple signals fed to their primary windings 98 and 100 to their secondary windings 102 and 104 respectively. Splitter 88 has output terminals 110 and 112 connected to the secondary winding. Splitter 90 has output terminals 114 and 116 also connected to its secondary winding. Capacitor 118 and resistor 120 are connected in series between terminals 110 and 112. Capacitor 122 and resistor 124 are connected in series between terminal 114 and terminal 116. RF taps 130, 132, 134, 136 are respectively connected through decoupling capacitors 142, 144, 146 and 148 to terminals 110, 112, 114 and 116. Although a four tap circuit 20 is shown in FIG. 3, other tap configurations such as two tap, eight tap, sixteen tap, configurations may be used in system 10 or 30.

Figure 4:
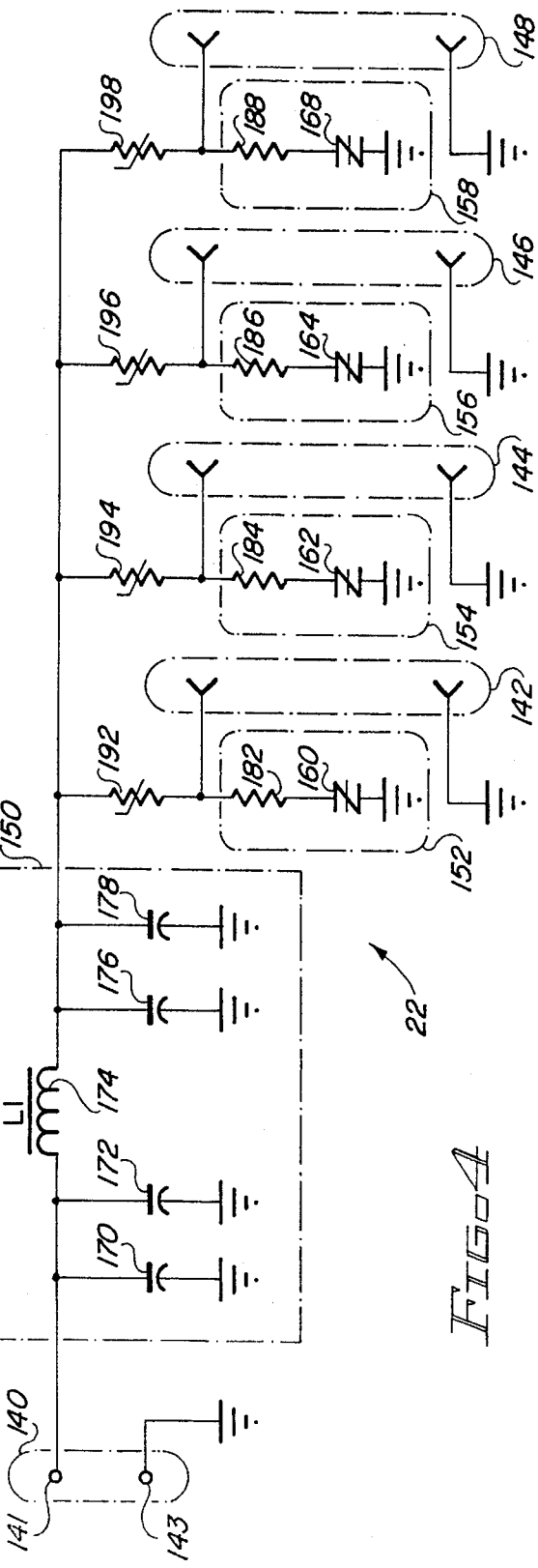
FIG. 4 is a schematic diagram of the power distribution unit shown in FIG. 1.

Referring to FIG. 4, there is shown a schematic diagram of a power distribution unit 22 having terminals 140 that includes input terminal 141 and ground terminal 145. Terminal 145 is electrically connected to tap rear plate 234 which is grounded. Terminal 141 is connected through RF filter 150 and positive temperature co-efficient resistors 192, 194, 196 and 198 to output terminals 142, 144, and 146 and 148 respectively. AC output terminals of PDU 22 each have a positive and negative terminal. Connected across the positive and negative terminals of the output terminals 142–148 are surge protection circuits 152, 154, 156, and 158.

RF filter 150 has its input connected to input terminal 141 and its output connected to limiting circuits 152–158. Connected between the input terminal of RF filter 150 and ground, are capacitors 170 and 172, which filter high frequencies on the AC signal fed to terminal 140. Connected in series between input terminal 141 and limiting circuits 152–158 is inductor 174 which prevents high frequencies passing from terminal 140 to terminals 142–148 and vice-versa. Connected in parallel to ground between the junction of inductor 174 and circuits 152–158 are capacitors 176 and 178.

Positive temperature co-efficient resistors 192–198, also referred to as varistors, limit the maximum current to terminals 142–148. As current increases through positive temperature co-efficient resistors 192–198 impedance becomes very large. When the currents through terminals 142–148 exceed a predetermined current level preferably 300 m AMPS at room temperature, resisters 192–198 become an effective open circuit.

Surge protection circuits 152, 154, 156, and 158 contain resistors 182–188 in series with Sidac's 160, 162, 164, and 168 respectively. Sidac's 160–168 in combination with their associated resisters 182–188, become an effective short circuit in the event of a high voltage across connectors 142–148.

Referring to FIG. 5, there is shown a CIU 24 having an input terminal 202 for receiving an AC signal and a terminal 204 for receiving a RF signal. The RF signal is passed to converter circuitry 200 which transforms the RF signal into video, telephony, and data signals in the proper format for transference to output terminal 206. The multi-media signals are then fed from output terminal 206 to a subscriber. The multi-media signals are also received from the subscriber through output terminal 206 and fed to converter 200. Converters are generally known in the art and transform the received multi-media signals from the subscriber into a RF format as previously described for distribution to a subscriber. These RF signals are fed through terminal 204 onto cable 28. The AC signal is received through terminal 202 to provide AC power for converter 200.

Figure 6A:
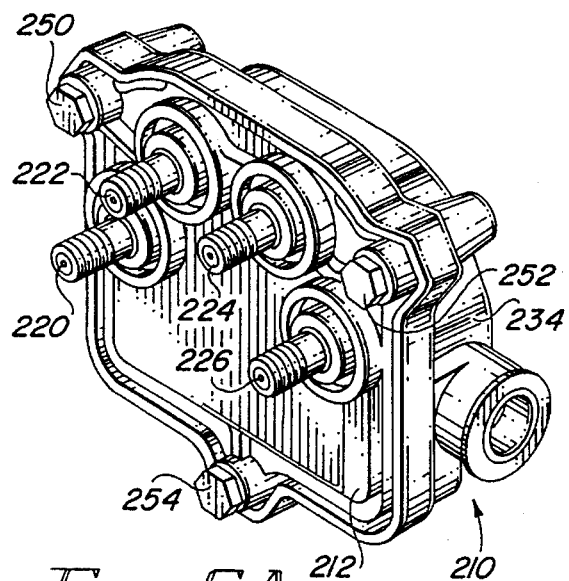
FIG. 6a is a perspective view and FIG. 6b is a front view of a prior art passive unit.
Figure 6B:
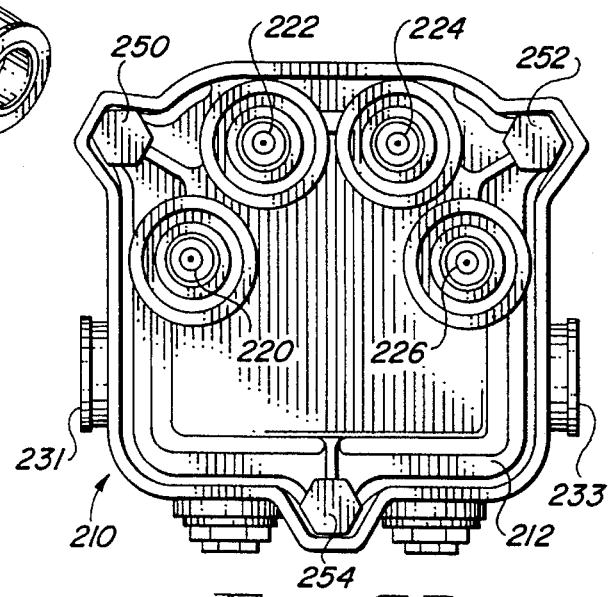

Referring to FIG. 6A, 6B, and 8, there is shown a conventional tap 210 having a removable face plate 212 on which is mounted RF connectors 220, 222, 224, and 226. These taps are generally known in the art and are available from Scientific-Atlanta, Inc. of Norcross, Ga. Tap 210 also has an input terminal 230 and an output terminal 232 through which a coaxial cable is fed to pass the composite signal. Connected to the back of faceplate 212 is removable rear panel 234 of tap 210. A circuit board 260 (FIG. 8) is in electrical contact with connectors 220, 222, 224 and 226 and is sandwiches between faceplate 212 and rear plate 234.

A preferred tap with its respective faceplate and rear plate are described in copending U.S. patent application filed Mar. 21, 1995 with Bart Spriester, and James L. Dale as the listed inventors and assigned to Scientific-Atlanta, Inc., the contents of which are hereby incorporated by reference.

Figure 7A:
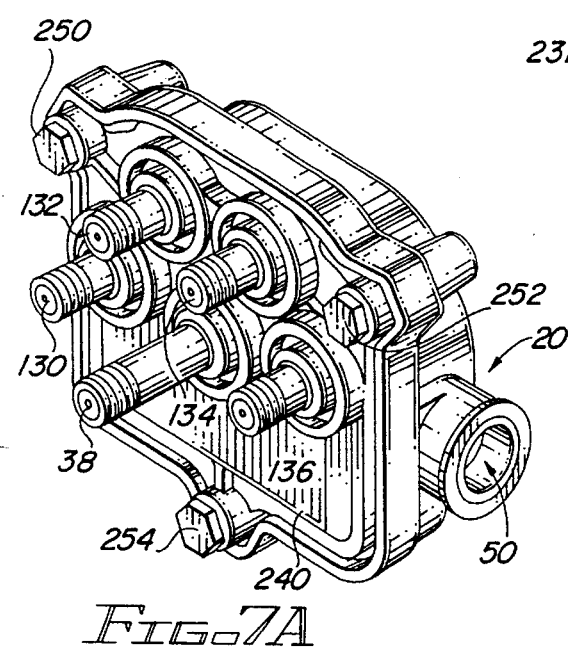
FIG. 7a is a perspective view and FIG. 7b is a front view of the passive unit shown in FIGS. 1 and 2.
Figure 7B:
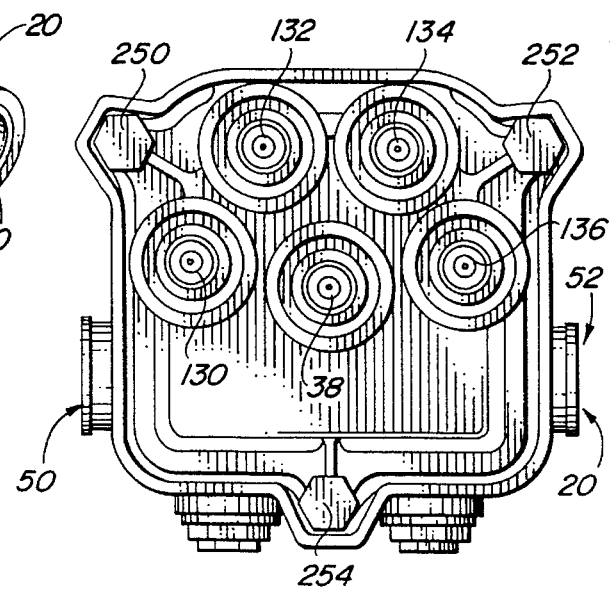
Figure 13:
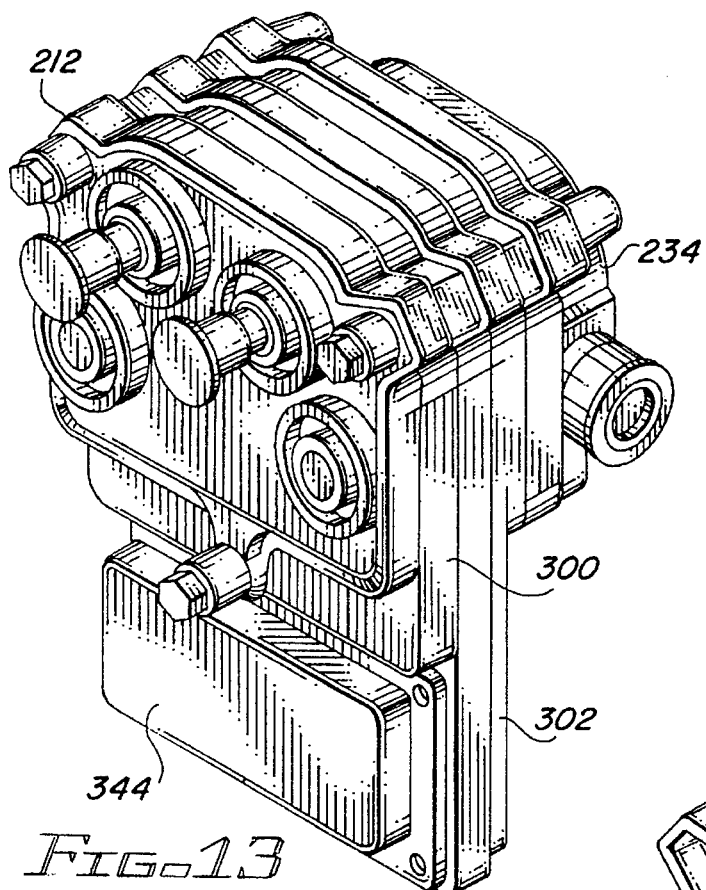
FIG. 13 is a perspective view of the power distribution unit and tap.
Figure 9B:
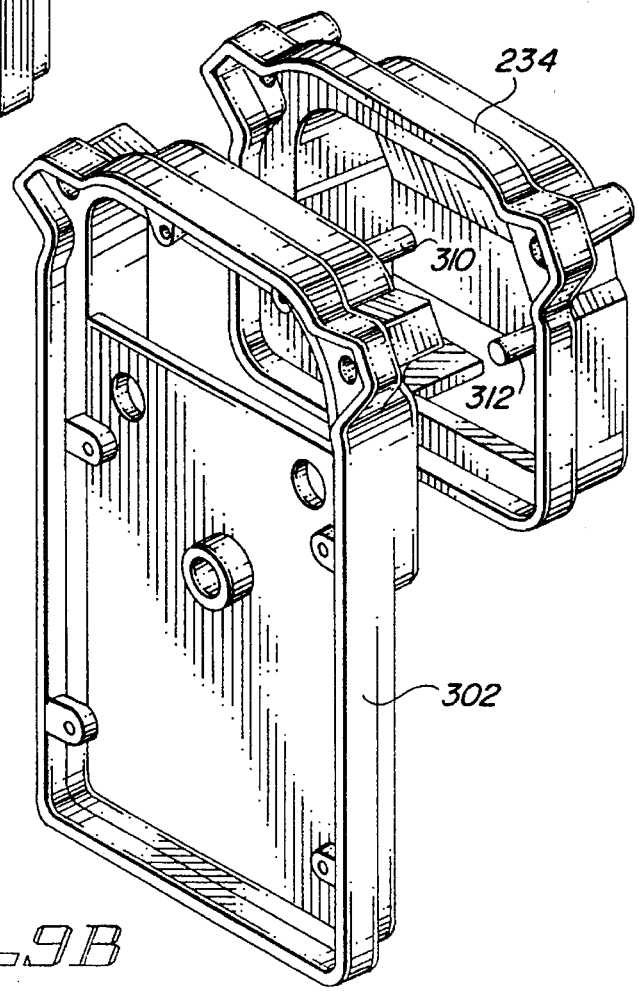

Referring to FIG. 7a and 7b, there is shown power passing tap 20 having a removable faceplate 240. Mounted on faceplate 240 are RF terminals 130, 132, 134, and 136. Also mounted on faceplate 240 is an AC power terminal or connector 242 containing an AC terminal 38. Tap 20 also has an input terminal 50 and an output terminal 52 through which a coaxial cable is fed.

Referring to FIG. 8, there is shown a backside of faceplate 240 having a circuit board 260 mounted thereon which contains circuit 20. Circuit board 260 contains receptors 248 and 250 which mate with two internal plugs 310 and 312 (FIG. 9B) on rear panel 234. The two plugs on rear panel 210 each contain fittings that receive network coaxial cable 25 fed through input terminals 230 and receive network cable 27 fed through output terminal 232 respectively. Plugs are rotatable to receive coaxial cables fed through terminals 231 and 233 (FIGS. 6B and 7B).

When it is desired to upgrade from Tap 210 to Tap 220, faceplate 212 is unscrewed from housing 234 by removing screws 250, 252, and 254. Once removed, a new faceplate and front panel 240 is reattached in place of the old faceplate and screws 250, 252 and 254 are then reattached to form the tap 20 shown in FIG. 7A and 7B. A coaxial cable is then connected to terminals 130–136 to feed the RF signal to the home. The AC terminal 38 is then connected to either the PDU for distribution of power to CIU 24. Ultimately, the AC signal from terminal 38 is connected to a NIU 32.

Referring to FIGS. 9–13, there is shown a preferred embodiment of power distribution unit 22B that includes PDU top assembly 300, PDU bottom assembly 302 and circuit board 304 sandwiched therebetween. Referring to FIG. 9A and 9B, assemblies 300 and 302 have an opening 314 with walls 316–319 extending there around. Covering one end of opening and engaging with top assembly 300 is face plate 212. Covering the other end of opening and engaging with bottom assembly 302 is rear plate 234. Top assembly 300 is connected to bottom assembly 302 with screws 290–292.

Extending through circuit board 304 are elongated PDU rotors 306 and 308. Rotors 306 and 308 have a spring receptacle at one end which respectively receives internal plugs or input terminals 310 and output terminal 312 in rear plate 234. The other end of PDU rotors 306 and 308 are plugs which mate with receptacles 248 and 250 (FIG. 8) on face plate 212. Rotors 306 and 308 are soldered on the rear plate side of circuit board 304 to terminals 141 and 143.

Mounted on the front plate side of circuit board 304 is PDU rotor holder 322. Holder 322 has two cylindrical openings 320 and 321 (FIG. 11) adjacent its ends and supports rotors 306 and 308. Holder 322 has an opening or aperture 323 about its middle portion though which extends retainer 324. Retainer 324 has a top engaging surface and four legs which fold inward to engage with holder 322 bottom surface. Retainer 324 slides freely in the aperture 323 in holder 322. Disposed between retainer 324 and holder 322 is elongated rectangular metal plate 326. Metal plate 326 is held in place and partially extends in aperture 323 when retainer 324 engages with holder 322. A portion of plate rests on surface 325 of holder 322 between aperture 323 and rotors 306 and 308. Plate 326 is curved at its ends to engage with rotors 306 and 308. Extending out from face plate 212 is protrusion 328 (FIG. 8). In its normal non-engaging position, plate 326 engages with rotors 306 and 308. When PDU assembly 22B is connected to rear plate 234, a short circuit connection is established between terminals 50 and 52.

When tap 20 engages with top assembly 300, receptors 248 and 250 engage with rotors 306 and 308. Subsequently protrusion 328 engages with the top surface of retainer 324 forcing retainer 324 middle portion down into the aperture 323. As retainer is forced into aperture, the ends metal plate 326 disengage from rotors 306 and 308 eliminating the short circuit caused by plate 326. However, the composite signal on network 25 is fed to the circuit board on tap 20.

When tap 20 is removed from top assembly 300, for repair, upgrade or maintenance, protrusion 328 disengages from the top surface of retainer 324 resulting in retainer 324 middle portion rising in aperture 323 due to the spring force of metal plate 326. As retainer rises, the ends of metal plate 326 engage with rotors 306 and 308 creating an electrical short between rotors 306 and 308, and subsequently terminals 50 and 52. As the tap is further removed receptors 248 and 250 disengage from rotors 306 and 308. However, throughout the removal and electrical connection is maintained between terminals 50 and 52 preventing interruption of service to customers downstream. Details of the operation of retainer plate against rotors 306 and 308 are described in the aforementioned co-pending application filed Mar. 21, 1995. Preferably bottom assembly 302 contains a protrusion 370. Pertrusion 370 extends perpendicularly and away therefrom to engage with a retainer located in rear plate 234 as described in the co-pending application.

Circuit board 304 supports an AC power distribution panel 340 having terminals 142–148 through which AC power is distributed downstream. Panel 342 into opening 342 in top assembly 300. A cover 344 encloses opening 342 to protect panel 340 from the environment. Power lines (not shown) extend into panel 340 though a gasket between cover 344 and top assembly 300. Preferably power lines extend into panel 340 though holes or cutout (not shown) in assembly 300.

It is preferably that assemblies 300 and 302 be constructed from a non-magnetic metal material. Assemblies 300 and 302, face plate 212 and rear plate 234 have a plastic or rubber type gasket material, as is known in the art, attached to their surfaces where the assemblies contact each other to prevent water leakage. It also preferably that an EMI gasket material be positioned adjacent the gasket material to prevent RFI leakage.

While the principles of the invention have been made clear in the illustrated embodiments, there will be immediately obvious to those skilled in the art, many modifications are structured arrangements proportions, elements, materials, and components used in the practice of the invention, in otherwise which are particularly adapted for specific environments and operational requirements, without departing from those principals. The appended claims are therefore intended to cover and embrace any such modifications within the limits only of the true spirit and scope of the invention.

What we claimed is:

1. A system for distributing multimedia information from a headend unit to a subscriber, the system comprising:
   1) a network media operative to distribute a composite AC power signal and RF signal, wherein the RF signal contains multimedia information originating from the headend;
   2) a tap including:
      a) a composite input terminal coupled to said network media for receiving said composite signal,
      b) a plurality of RF output terminals to which said RF signal received by said composite input terminal is fed, and
      c) an AC output terminal to which said AC signal received by said composite input terminal is distributed;
   3) a power distribution unit including:
      a) an input terminal connected to said AC output terminal via a power line and receiving the AC power signal on said power line,
      b) a plurality of AC output terminals to which the received AC power signal is fed; and
      c) a limiter disposed within said power distribution unit and operative to limit a maximum output current of the AC power signal fed to the AC output terminals.

2. The system as recited in claim 1 further comprising:
   an RF subscriber media coupled to one Of said plurality of RF output terminals for distributing said RF signal;
   an AC subscriber media coupled to one of said plurality of AC output terminals for distributing the AC power signal; and
   a customer interface unit coupled to the home of the subscriber, the AC subscriber media and the RF subscriber media, said customer interface unit having a RF input terminal for receiving the RF signal from one of the output terminals on the tap and having an AC input terminal receiving the AC power signal, said customer interface unit decoding the RF signal into subscriber signals and retransmitting the RF signal onto a plurality of different subscriber transmission lines.

3. The system as recited in claim 1 further wherein the tap has a faceplate and a rear plate, and wherein power distribution unit is removable connected to the tap between the face plate and the rear plate.

4. An apparatus for distributing a composite AC and RF signal transmitted over a network media, the apparatus comprising:
   1) a tap including:
      a) a rear plate having a composite input terminal coupled to said network media through which said composite signal is received and having a composite output terminal through which said composite signal is distributed to said network media;
      b) an RF circuit electrically coupled to said composite input terminal and operative to split the RF signal from the composite signal;
      b) a face plate operative to engage with the rear plate and having an RF output terminal connected thereto to which said split RF signal is fed; and
   2) a power distribution unit (PDU) disposed between said rear plate and said faceplate, said PDU including:
      a) a power distribution circuit coupled to said input terminal and splitting the AC power signal from the composite signal;
      b) a plurality of AC output terminals to which the AC power signal is fed; and
      c) a limiter disposed within said power distribution unit and operative to limit a maximum output current of the AC power signal fed to the AC output terminals.

5. The apparatus as recited in claim 4 wherein said RF circuit is attached to said faceplate.

6. The apparatus as recited in claim 4 wherein said PDU contains a plurality of connectors for removably engaging said faceplate from said PDU.

7. The apparatus as recited in claim 6 further comprising means mounted on said PDU for electrically connecting said composite input terminal to said composite output terminal when said tap is disengaged from said PDU.

8. The apparatus as recited in claim 7 further comprising means for disconnecting said composite input terminal from said composite output terminal when said tap is reengaged with said PDU.

9. An apparatus for distributing a composite AC and RF signal transmitted over a network media, the apparatus comprising:
   a rear plate having a composite input terminal coupled to the network media through which the composite signal is received and having a composite output terminal through which the composite signal is distributed;
   a circuit, electrically coupled to said composite input terminal, operative to split the AC power signal and the RF signal from the composite signal;
   a face plate operative to engage with said rear plate and having a plurality of RF output terminals connected thereto to which the split RF signal is fed;
   a plurality of AC output terminals to which the split AC power signal is fed; and
   a limiter electrically coupled to said circuit and operative to limit an output current of the split AC power signal fed to the AC output terminals.

10. The apparatus as recited in claim 9 wherein the RF output terminals are physically separated from the AC output terminals.

11. The apparatus as recited in claim 9 wherein the circuit is coupled to the face plate and has a receptacle that engages with the composite input terminal.

12. The apparatus as recited in claim 9 further comprising:
    means for permitting said face plate to disengage from said rear plate; and
    means for electrically shorting said composite input terminal to said composite output terminal when said face plate is disengaged from said rear plate.

* * * * *